United States Patent [19]

Takeda

[11] Patent Number: 4,825,422
[45] Date of Patent: Apr. 25, 1989

[54] METHOD AND APPARATUS FOR DETERMINING THE LOCAL VELOCITIES IN A MOVING FLUID BY MEANS OF DOPPLER ULTRASONIC ECHOGRAPHY

[75] Inventor: Yasushi Takeda, Brugg, Switzerland

[73] Assignee: Novatec S.A., Renens, Switzerland

[21] Appl. No.: 188,077

[22] Filed: Apr. 28, 1988

Related U.S. Application Data

[63] Continuation of Ser. No. 855,301, Apr. 24, 1986.

[30] Foreign Application Priority Data

May 9, 1985 [CH] Switzerland ................. 2009/85

[51] Int. Cl.$^4$ ............................................ G01F 1/66
[52] U.S. Cl. .................................. 367/90; 73/861.25;
128/661.08
[58] Field of Search .......... 367/90; 73/861.25, 861.26;
128/0–663

[56] References Cited

U.S. PATENT DOCUMENTS

| | | | |
|---|---|---|---|
| 3,498,290 | 3/1970 | Shaw et al. | 367/90 X |
| 3,550,070 | 12/1970 | McLeod, Jr. | 367/90 |
| 3,554,030 | 1/1971 | Peronneau | 367/90 X |
| 3,888,238 | 6/1975 | Meindl et al. | 367/90 X |
| 3,974,692 | 8/1976 | Hassler . | |
| 4,103,679 | 8/1978 | Aronson | 73/861.25 X |
| 4,127,842 | 11/1978 | Hassler . | |
| 4,680,739 | 7/1987 | Lannuzel . | |

OTHER PUBLICATIONS

Harada, "Fluid Control and Measurement", Society of Instrument and Control Engineers, Japan, Sep. 1985.
Takeda, "Velocity Profile Measurement by Ultrasound Doppler Shift method", Int J. Heat and Fluid flow, 1986.

Primary Examiner—Thomas H. Tarcza
Assistant Examiner—Mark Hellner
Attorney, Agent, or Firm—Pollock, VandeSande and Priddy

[57] ABSTRACT

A measure window (29–30, FIG. 2d) is provided in a Doppler velocity profile (FIG. 2c) by deleting an initial section ($T_1$) and a terminal section ($T_2$) of each emission cycle of a train of ultrasound of a period T so as to conserve only the section ($T_o$) which it is desirable to study. The conserved section ($T_o$) is thereafter segmented into a certain number (N) of measure channels. The advantage of restricting the zone divided into channels to the part which is really useful is that the definition of the profile which is obtained is improved, even when the emitter-receptor of ultrasound is located at a relatively important distance in comparison with the depth of the zone which is studied.

2 Claims, 5 Drawing Sheets $\tau' > \tau$

METHOD AND APPARATUS FOR DETERMINING THE LOCAL VELOCITIES IN A MOVING FLUID BY MEANS OF DOPPLER ULTRASONIC ECHOGRAPHY

This application is a continuation of Ser. No. 855,301, filed on Apr. 24, 1986.

BACKGROUND OF THE INVENTION

The use of Doppler echography presents a difficulty when this technique is used for measuring the local velocities of a fluid at a high temperature or moving inside a conduit having a thick wall. In such cases, the transducer (or transducers) used for emitting the ultrasounds and for receiving their echo is (are) located at a significant distance from the liquid, either because of the thickness of the wall, or because of the need to insulate the transducer(s) from heat. As a result, the usual division into observation channels concerns a length which can also be important in comparison with the width of the zone of interest to be examined, and because the number of channels available is limited, the resolution is diminished.

SUMMARY OF THE INVENTION

The present invention is aimed at overcoming this drawback by providing means for restricting the division into observation channels to the width of the zone to be examined which will normally correspond to the layer of liquid, thus conserving in all circumstances a good resolution.

BRIEF DESCRIPTION OF THE DRAWINGS

The drawings are a schematic representation given by way of example of an embodiment of apparatus according to the invention, illustrating the method.

PREFERRED EMBODIMENT OF THE INVENTION

Figure 1:
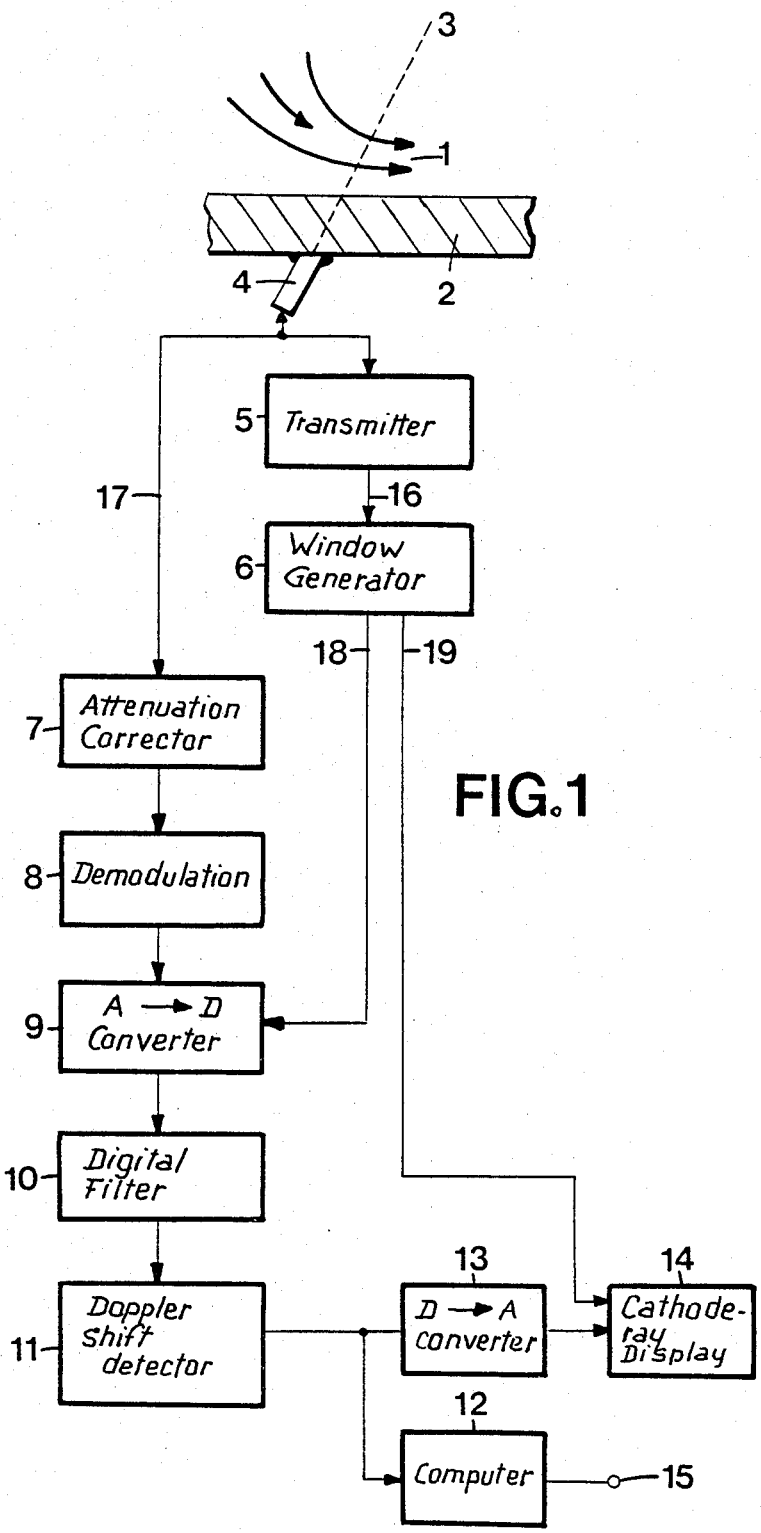
FIG. 1 is a block diagram showing the entirety of the apparatus.

FIG. 1 is a block diagram of the embodiment of the invention. The arrows 1 indicate the moving liquid or other fluid in which solid particles are suspended. This liquid is in a vessel with a thick wall 2. Reference numeral 3 indicates schematically the axis of the transducer 4 used for generating ultrasound which propagates along the axis 3 (which is oriented obliquely with respect to the wall 2) and receiving the echo, i.e. the waves reflected from the particles on the axis 3. An example of such a transducer is described in the publication 11. The design of efficient broad-band piezoelectric transducers 11 by Charles S. Desilets, John D. Fraser and Gordon S. Kino; IEEE Transactions on Sonics and Ultrasonics, vol. SU-25, No 3, p. 115–125. The echo signal received by the transducer 4 controls a series of known elements to provide an image of the Doppler effect resulting from the reflection on the moving particles on the screen of the cathode-ray tube 14; the Doppler effect curve also represents the variation of the velocity component of the liquid along the axis 3 with the distance from the transducer 4. At the same time, the apparatus provides by known means digital data on the velocity curve to the computer 12 which uses them in particular to calculate the absolute velocities of the liquid along the axis 3 for delivery through the output 15.

Known means are used for carrying out the ultrasonic Doppler echography measurements which are represented by the elements 7, 8, 9, 10 and 11 and will be described only briefly, since they are known in the art. Element 7 is an attenuation corrector which is provided to compensate the attenuation of the ultrasound along the axis 3 from the transducer and back to it. The attenuation coefficient A is calculated by using the following relations:

$A(t) = a(t) \cdot b(t)$
$a(t) = h \cdot t$
$b(t) = k \cdot \exp. (f \cdot t)$

In these relations, t is the time corresponding to each position along the axis 3, h is the distance covered along the axis 3, f is the frequency of the ultrasonic oscillations, and k is a coefficient which depends on the nature of the liquid.

Element 8 is a demodulator of a known type, element 9 is an analog to digital converter, and element 10 is a digital filter for eliminating the noise from the frequency, and which originates either from various undesirable sources or from movements of the container or of the conduit in which the liquid flows. An example of such a filter can be found in the following publication : Urkowitz, H.; Analysis and synthesis of delay line periodic filters : IRE Trans. Circuit theory, CT-4, 41 1957. Element 11 is a known Doppler shift detector normally used in ultrasonic Doppler echography. Element 12 is a computer.

The apparatus shown further comprises a transmitter 5 for providing the transducer 4 with electrical oscillations of a frequency f which the latter converts into ultrasound. Further, the transmitter transmits its oscillations to a window generator device 6 which is showed in detail in FIG. 3.

This window generator device 6 comprises a delay 20 which is adjustable and is used for delaying by a selected time the passage of the pulses it receives through 16 and eliminating a certain number of the oscillations which are the first to arrive. An oscillator 22 which is equally adjustable is used for providing periodic time intervals τ. Element 23 is a pulse counter for counting the pulses it receives from the oscillator 22 and the number of which corresponds to the number of observation channels of the Doppler effect with which it is desired to work. This counter 23 is controlled by the delay 20 so as to start counting the pulses (selected with the counter selector 26) only after the delay imposed by element 20 has elapsed. The window generator device 6 further comprises a flip-flop 21, an OR gate 24 and an AND gate 25. The operations of this device will be described further.

It happens in some industrial applications that the liquid is at a high temperature or that it is inside a container with a wall which is very thick in comparison with the layer of the liquid to be examined. These two situations pose a problem because the transducer is located at a distance which is important in comparison with the thickness of the liquid layer to be examined, and this has an unfavourable effect on the resolution achieved through the Doppler analysis. In fact when the liquid is at a high temperature and the wall is relatively thin, an insulation of some thickness must be provided for ensuring the protection of the transducer 4 from the heat of the wall 2.

Figure 2A:
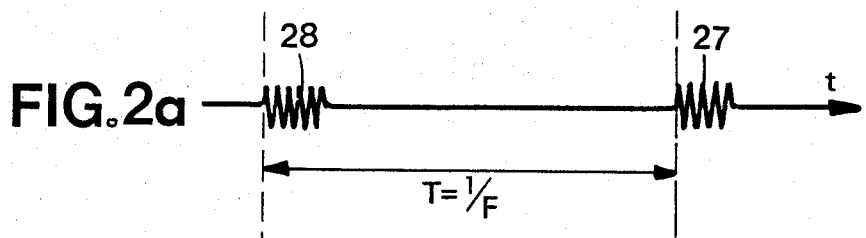
FIG. 2a-2e are explanatory diagrams.
Figure 2B:
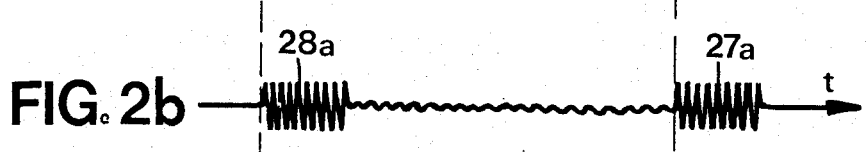
Figure 2C:
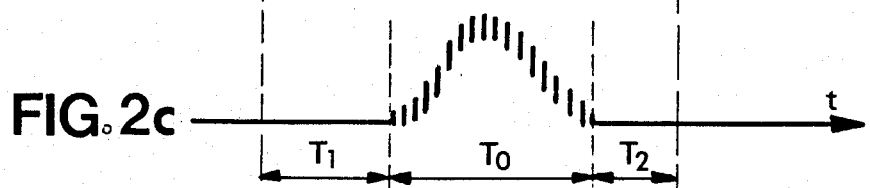
Figure 2D:
Figure 2E:
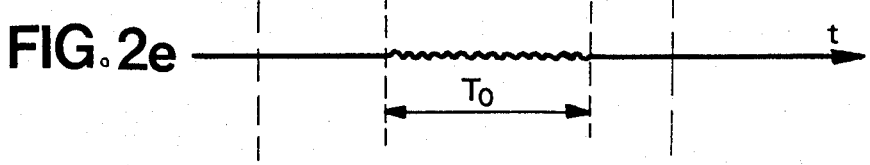
Figure 3:
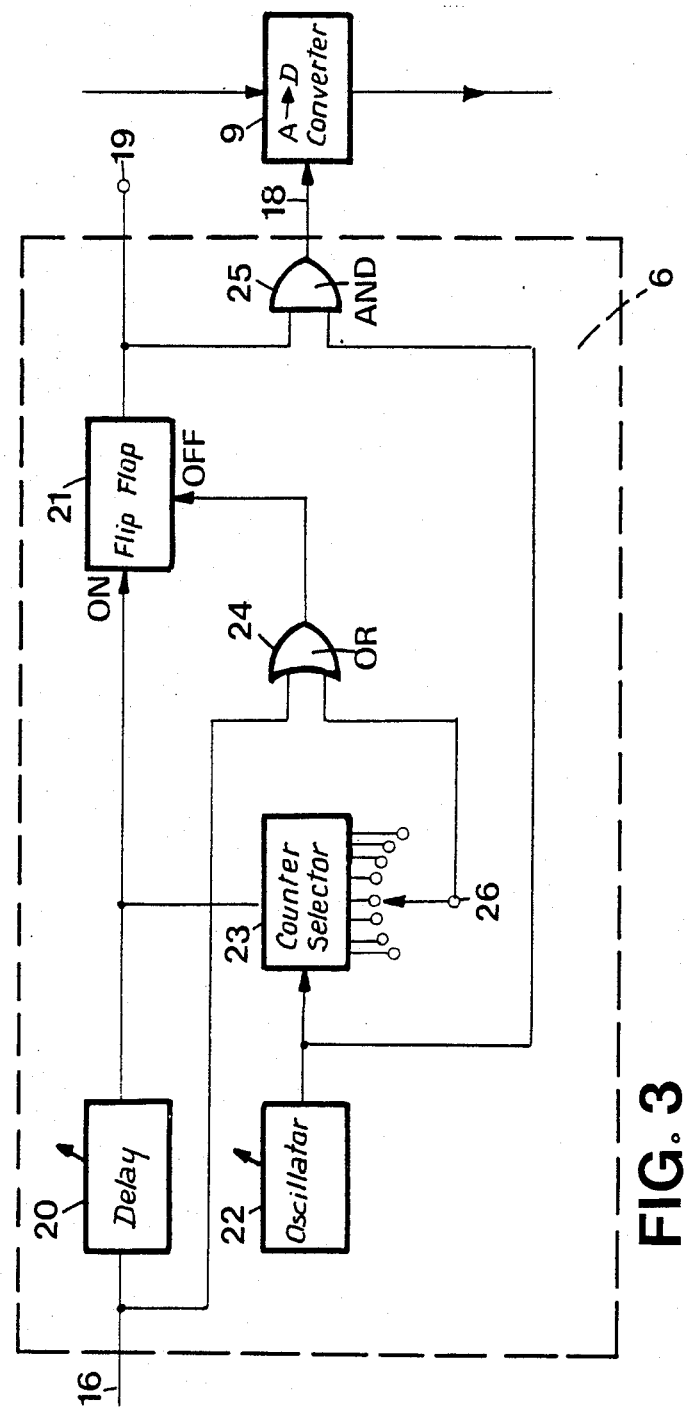
FIG. 3 is a block diagram of one of the components of the apparatus of FIG. 1.

FIG. 2 shows schematically the acoustic phenomena which take place in the apparatus of FIGS. 1 and 3. FIG. 2a shows a train of sinusoidal ultrasonic waves 27 emitted from the transducer 4; 28 is the following train of ultrasonic waves emitted by the same transducer. F is the frequency with which the trains follow one another, and T is the time which elapses between two successive trains. FIG. 2b shows the reflected trains of waves received by the transducer 4; 27a is a first train of waves which corresponds to 27, and 28a is the train of waves which corresponds to 28. The length of each of these reflected trains is slightly greater than that of 27 and 28 because of the internal reflections in the transducer.

FIG. 2c shows an example of the axial velocity component taken along the axis 3 as it appears on the screen of the cathode-ray tube 14. The horizontal part on the left $T_1$ corresponds to when the velocity of the liquid is nil i.e. to the time elapsed between the beginning of T and the instant when the ultrasonic train reaches the liquid. A curve with a rising portion and a decreasing portion follows the flat section $T_1$ and represents the variation of the velocity along the section of the axis intersecting with the liquid. This curve has a length $T_o$. The terminal horizontal section $T_2$ corresponds to the difference between T and the time interval separating the emission of a train of waves and its arrival at the end of the liquid zone. If, and as is usually done, the time T was segmented into a certain number of measure channels, the resolution would be relatively poor, because of the distance separating the transducer from the end of the studied zone. As the number of channels is limited, one would have to accept this situation. The window generator device 6 has for basic purpose to focus the division into a given number of channels on the part of the diagram which is of interest, i.e. on the rising and decreasing section. This is realized in the following manner. The curve of FIG. 2c is observed on the screen of the cathode-ray tube 14 and the delay device 20 is operated to introduce a delay in the transmission of the pulses received through 16 from the transmitter 5, and this delay is increased until the rising part of the curve of FIG. 2c is reached. The final delay is equal to $T_1$ (FIG. 2c).

Further, to eliminate the undesirable effect of the unwanted section which follows the decrease to zero of the decreasing section of the curve, the oscillator 22 is adjusted to deliver oscillations of a length $\tau$, and the pulse counter 23 is adjusted to a value N which is selected so that the product $N \cdot \tau$ is equal to a time $T_o$ (FIG. 2c) corresponding exactly or as near to exactly as possible to the terminal section of the curve of FIG. 2c. When this is done, the flip-flop 21 will allow (after a time delay $T_1$) the passage of the pulses arriving from the transmitter 5. At this moment, the counter 23 begins to count. This moment corresponds as was discussed above to when the curve of FIG. 2c begins to rise. When the curve of FIG. 2c arrives at zero in its decreasing section, the counter 23 will have counted the selected number of pulses having the duration $\tau$, and will act through the output 26 and the OR gate 24 on the flip-flop 21 to reset it to the OFF position to prevent the passage of pulses from delay 20. In the case where it would not be possible to find a product $\tau \cdot N$ of such a value that the count be terminated before the end of the period T (FIG. 2a), the following happens: the arrival of the train of ultrasonic waves following the train 28 to the OR gate 24 before the count by 23 is terminated acts on the flip-flop to reset it to the OFF position to prevent the passage of pulses coming from delay 20. In this case, the final part of the count will be without any effect since it falls outside the period T.

FIG. 2d shows schematically the functioning of the flip-flop 21 which opens the passage at 29 and closes the passage at 30. The interval of time $T_o$ separating these two instants constitutes the measure window. It is during this time $T_o$ that the velocity calculations are carried out in the N selected channels. In practice, N will be selected as high as possible. In fact, it is the number of channels N which determines the degree of resolution.

The Doppler shift detector 11 delivers through its output the values of the velocity component taken along the axis 3 and determined for each measure channel, and these values are received on the one hand by the digital to analog converter 14 which in turn transfers these data to the cathode-ray tube 14, and on the other hand by the computer 12 for calculating from these digital values the absolute values of the velocity at the various points selected along the acoustical axis 3. An example of such a device is given in the U.S. Pat. No. 3,514,747 and in the following publication: Accuracy and limitations of the ultrasonic Doppler blood velocimeter and zero crossing detector; M. J. Lunt; Ultrasound in Medicine and Biology, vol. 2, 1975, p. 1-10.

As a result of the window 29-30 being used, the screen of the tube 14 will only show the Doppler effect curves or the velocity component along the axis 3 curves during the time $T_o$, and the sections corresponding to the periods of time $T_1$ and $T_2$ when ultrasound is propagating outside the liquid are deleted.

It can therefore be seen that the apparatus described here can be made to focus the measure channels on the useful part of the Doppler curve, and ignore the section of the curve where the ultrasound propagates outside the liquid zone of interest. This liquid zone does not have to extend to the wall of the container, and can be restricted and narrowed to a particular region of the liquid where it is desired to examine in detail some phenomenon associated with the velocity distribution. For this purpose it suffices to adjust the opening 29 and the closing 30 of the window to the part of the velocity curve corresponding to the particular region of interest.

FIG. 4 shows schematically how the number N is selected in practice. In this example, it is assumed that a liquid 31 flows in a conduit 32 and that the velocity distribution curve established by using the transducer 34 according to the method described above hcorresponds to the curve 33 (see FIG. 4a). FIGS. 4b, 4c and 4d correspond to examples of Doppler profiles for several combinations of $\tau$ and N values. The measure window was chosen as indicated by $T_b$ on FIG. 4b.

Figure 4A:
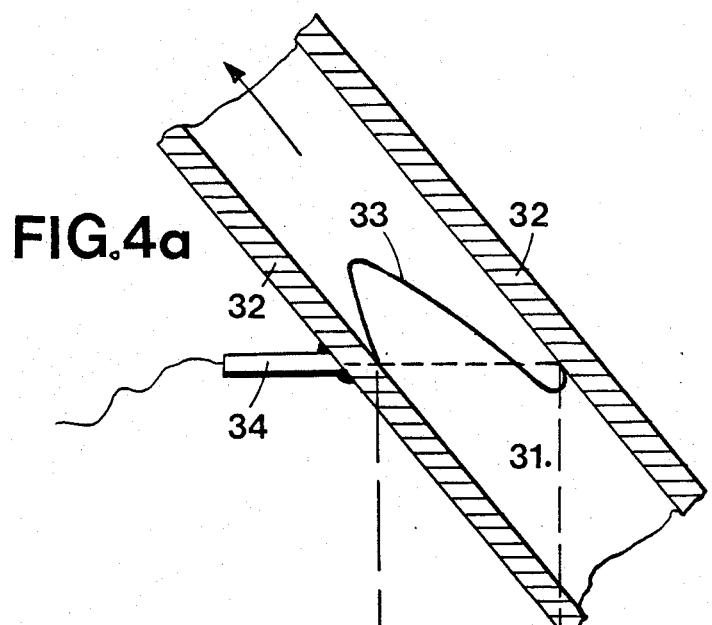
FIG. 4a-4d are explanatory diagrams for the functioning of the apparatus of FIG. 1.
Figure 4B:
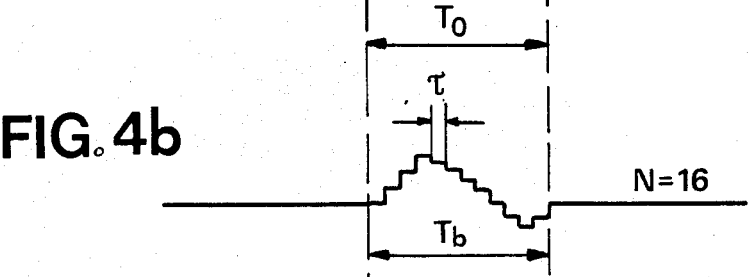
Figure 4C:
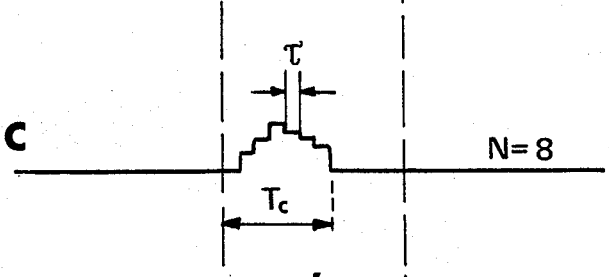
Figure 4D:
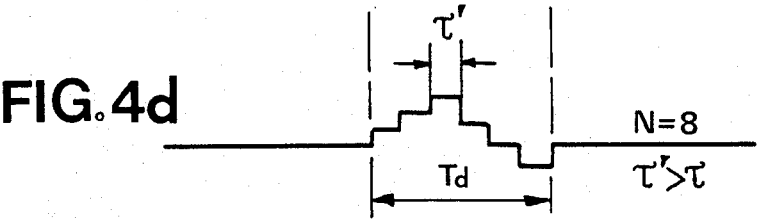

Firstly, N is selected equal to 16, which gives the velocity diagram of FIG. 4b which fits almost exactly in the measure window $T_o$, since 12 channels coincide with the time $T_o$ and the 4 last channels are deleted by the pulse of the beginning of the following train of ultrasonic waves as was described above. Had N been selected equal to 8, the speed diagram would have been truncated on the right side with the curve stopping after the eighth channel as shown on FIG. 4c. In FIG. 4c $\tau$ has the same value as in FIG. 4b. If however N had been chosen equal to 8 and $\tau$ is given a value $\tau'$ higher than $\tau$, the diagram of FIG. 4d would have been obtained where the resolution is less good and where 2 channels are found excluded because they come after the end of $T_d$. Therefore, there are three ways of fixing the closing 30 of the window (FIG. 2d): by choosing N using the counter 23, by choosing $\tau$ using the oscillator 22, or by using the beginning of the following train of ultrasonic waves.

The frequency of the ultrasound f is determined by the range of speeds to be measured, by the maximum and minimum propagation speeds of the ultrasound in the medium, and by the attenuation and the resolution which are required. The maximum number of measure channels $N_{max}$ is fixed and is indirectly related to the Doppler relation:

$$v = \frac{c \cdot f_D}{2f}$$

where
v=fluid velocity,
c=sound velocity in fluid,
$f_D$=Doppler frequency,
f=frequency of the ultrasound which is used, and to Nyquist's frequency relation:

$$f_D \leq \frac{F}{2}$$

where F is the frequency at which the trains of ultrasonic waves are repeated.

It is advantageous that two different ultrasound frequencies be available, which gives the possibility of choosing the frequency which is the best adapted to the circumstances: a relatively low frequency will be used for relatively large measure profiles, and a higher frequency will be performed for shorter profiles. In this manner, the range of measuring distances and of position resolutions is increased. This enables a lowering of the minimum velocity level which can be detected, or otherwise said of the threshold velocity.

The trains of ultrasonic waves emitted by the transducer can be adjusted by known means in their amplitude and their duration according to the attenuation coefficient A of the fluid (see above) and to the accuracy and resolution which are required.

The number of sinusoidal oscillations comprised in each ultrasonic train can be adjusted for example as described in the following publication: McLeod, F. D., Anliker, M.: A multiple gate pulse Doppler flowmeter: Proc. IEEE Ultrasonics, Miami, 1971.

The fact that a window is provided as was described for the signal which is to be analyzed by Doppler echography has the advantages that the transducer and the fluid the velocity profile of which is to be examined can be separated by quite a distance, that the region of the fluid which is to be subjected to the Doppler analysis can be chosen with a considerable amount of freedom, and that a better resolution can be achieved than by the normal method although using the same number of channels.

Figure 5:
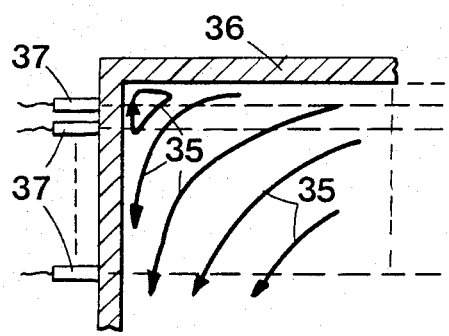
FIG. 5 illustrates an example of use of the apparatus of FIG. 1.
Figure 6:
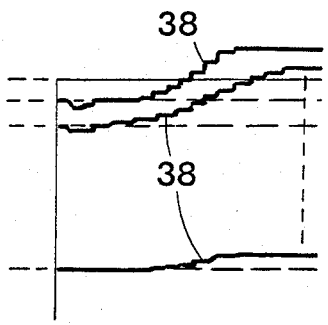
FIG. 6 is a velocity diagram corresponding to FIG. 5.

FIG. 5 illustrates an example of use of the apparatus of FIG. 1 for determining the velocity distribution along several parallel lines all located in the same plane. In the particular case considered here, the flow of a fluid is examined in an angular zone of a tank or a conduit. The different lines 35 indicate the trajectories followed by different points of the liquid mass. Reference numeral 36 indicates the wall of the tank or of the conduit, and 37 a series of transducers such as 4 (FIG. 1) which are all located in the same plane with their axes parallel and spaced at the same distance. The velocity diagram 38 determined by Doppler echography using the transducers 37 is shown in FIG. 6. The velocities which are given are obviously the velocity components of the actual velocities taken along the acoustical axes of the respective transducers.

For establishing the diagram of FIG. 6, one can either use a series of transducers 37 with each transducer being provided with an apparatus according to FIG. 1, or a series of transducers 37 connected to a single apparatus according to FIG. 1 which is used successively with different transducers by means of an electronic commutator. One can also use—if the time factor is not of prime importance—a single transducer 37 provided with the electronic equipment of FIG. 1 and a mechanical device for shifting the transducer to the different positions occupied by the series of transducers of FIG. 5.

Figure 7:
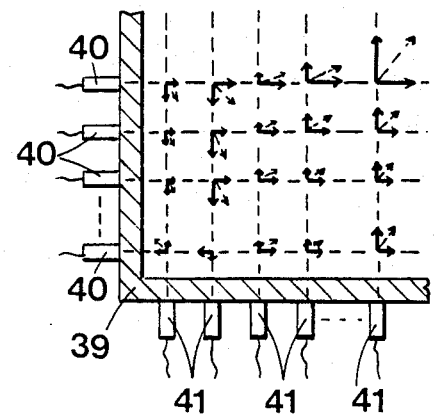
FIG. 7 shows the manner in which the apparatus of FIG. 1 is used for determining the velocity vectors at different points of a plane intersecting with a volume of moving fluid.

FIG. 7 shows how to establish by using a series of transducers according to FIG. 1 the vectorial velocity in a plane (i. e. the length and the direction of the velocity vectors). In this Figure, reference numeral 39 indicates the corner of a tank similar to 36 in FIG. 5, numerals 40 represent a series of parallel and equally spaced transducers similar to transducers 37 of FIG. 5, and numerals 41 represent another series of transducers which are oriented perpendicularly to the transducers 40. The measurements carried out with the transducers 40 and the transducers 41 enable one to establish for each intersection point of the acoustical axes shown in dotted lines in FIG. 7 the velocity component along each of the axes and the resulting velocity vector. The computer 12 of FIG. 1 can carry out without difficulty the calculations for obtaining the velocity components and their resulting velocity vectors.

Quite obviously, the same method could be applied to the third dimension by setting up above each transducer 40, 41 a series of regularly spaced transducers. If for example 5 transducers were provided along each direction, the total number of transducers in a tridimensional system would amount to $5 \times 5 \times 5 = 125$ transducers. As was explained above, the number of electric circuits can be reduced by using commutating means.

The time required for obtaining a velocity profile along an acoustical axis being very small (of the order of 10 milliseconds) in comparison with the time constant of the fluctuations in the flow of the fluid, both stationary and nonstationary flows can be analysed.

What I claim is:

1. In a method for determining by ultrasonic Doppler echography the local velocities inside a freely chosen portion of a moving fluid carrying solid particles, which method comprises the steps of periodically emitting trains of ultrasound from a transducer through the fluid and along an acoustical axis in successive cycles each of which commences with the emission of one of said trains of ultrasound, and receiving at said transducer echoes propagating along said axis resulting from the reflection of said ultrasound on said particles, the improvement which comprises providing during each such cycle a measure window of adjustable length ($\tau \cdot N$) along said axis, where $\tau$ is the time resolution and N is the number of measurement channels, adjusting the length of said measure window by adjusting the frequency of a variable frequency oscillator to obtain a desired time resolution $\tau$ and by adjusting an adjustable pulse counter to select the number of measurement channels N according to the chosen resolution, to cover with the desired time resolution the entire length of the window to be analyzed, which corresponds to the time duration of a portion of interest of a velocity curve for any area chosen at will along the said axis, and measuring the average fluid velocity for each of said measurement channels.

2. In an apparatus for determining the local velocities inside a freely chosen portion of a mass of moving fluid containing solid particles by means of Doppler ultrasonic echography, said apparatus being of the type comprising at least one transducer operative in a plurality of cycles to emit periodic trains of ultrasound through the fluid and along an acoustical axis and for receiving echoes resulting from the reflection of said ultrasound from said particles along said axis, the improvement comprising an adjustable measure window generator operable to provide a measurement window of variable length and position, the length L of said window being equal to $\tau \cdot N$, where $\tau$ is the time resolution of the window and N is the number of measurement channels into which said window length is divided, said measure window generator including means for adjusting an adjustable delay element to define the beginning time of the window thereby to select the position of said window, an adjustable oscillator operative to periodically provide pulses of a selected duration, means for adjusting the frequency of said oscillator to select the resolution $\tau$ of said window, an adjustable pulse counter coupled to said oscillator and to said delay element, means for adjusting said pulse counter to select the number N of measurement channels into which the time period $N \cdot \tau$, constituting the length L of said window corresponding to the time duration of a portion of interest of a Doppler effect velocity curve resulting from the movement of said particles, should be divided, and means for measuring the average fluid velocity for reach of said N measurement channels during each of said cycles.

* * * * *